US006299989B1

(12) United States Patent
De Cristofaro et al.

(10) Patent No.: US 6,299,989 B1
(45) Date of Patent: Oct. 9, 2001

(54) HIGH STACK FACTOR AMORPHOUS METAL RIBBON AND TRANSFORMER CORES

(75) Inventors: Nicholas De Cristofaro, Chatham; Richard L. Bye, Jr., Morristown; Dung A. Ngo, Morris Plains; Michael L. Briggs, Budd Lake, all of NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/311,423

(22) Filed: May 13, 1999

Related U.S. Application Data

(60) Provisional application No. 60/085,276, filed on May 13, 1998.

(51) Int. Cl.[7] .................... B32B 15/18

(52) U.S. Cl. .................... 428/637; 164/463; 336/234; 428/606; 428/687; 428/900; 428/928; 428/937

(58) Field of Search .................... 428/606, 637, 428/687, 900, 937, 928; 148/304, 403; 336/234; 164/463, 423, DIG. 15

(56) References Cited

U.S. PATENT DOCUMENTS

| | | | | |
|---|---|---|---|---|
| 4,142,571 | | 3/1979 | Narasimhan | 164/88 |
| 4,734,975 | | 4/1988 | Ballard et al. | 29/606 |
| 4,865,644 | * | 9/1989 | Charles | 75/351 |
| 5,261,152 | | 11/1993 | Simozaki et al. | 29/609 |
| 5,301,742 | * | 4/1994 | Sato et al. | 164/463 |
| 5,329,270 | | 7/1994 | Freeman | 336/213 |
| 5,765,625 | * | 6/1998 | Yukumoto et al. | 164/463 |

FOREIGN PATENT DOCUMENTS 0 473782 A1 3/1992 (EP) .

OTHER PUBLICATIONS

H.W. Ng, et al., "Amorphous Alloy Core Distribution Transformers", proceedings of the IEEE, vol. 79, No. 11, Nov. 1991.

* cited by examiner

*Primary Examiner*—Deborah Jones
*Assistant Examiner*—Robert R. Koehler
(74) *Attorney, Agent, or Firm*—Charlotte H. Copperthite

(57) ABSTRACT

The present invention relates to a high stack factor amorphous metal transformer core, and to a process for constructing a high stack factor amorphous metal transformer core. The process uses high lamination factor amorphous metal ribbon (the term lamination factor is generally used to express the smoothness and uniformity of the ribbon, whereas the term stack factor is applied to cores made from ribbon); that is, amorphous metal ribbon with a highly smooth surface and a highly uniform thickness as measured across the ribbon width. High stack factor amorphous metal ribbon can be efficiently packed, by winding or stacking operations, into compact transformer core shapes. The transformer core can then be clamped, to further reduce overall dimensions, and annealed, to relieve residual mechanical stresses and to generate a desired magnetic anisotropy, without detriment to the final magnetic properties.

8 Claims, No Drawings

HIGH STACK FACTOR AMORPHOUS METAL RIBBON AND TRANSFORMER CORES

The present application claims priority from U.S. Provisional Application Serial No. 60/085,276 filed on May 13, 1998.

BACKGROUND OF THE INVENTION

1. Field of the Invention

The present invention relates to a high stack factor amorphous metal transformer core, and to a process for constructing a high stack factor amorphous metal transformer core. The process uses high lamination factor amorphous metal ribbon (the term lamination factor is generally used to express the smoothness and uniformity of the ribbon, whereas the term stack factor is applied to cores made from ribbon); that is, amorphous metal ribbon with a highly smooth surface and a highly uniform thickness as measured across the ribbon width. High stack factor amorphous metal ribbon can be efficiently packed, by winding or stacking operations, into compact transformer core shapes. The transformer core can then be clamped, to further reduce overall dimensions, and annealed, to relieve residual mechanical stresses and to generate a desired magnetic anisotropy, without detriment to the final magnetic properties.

High stack factor amorphous metal transformer cores will have smaller core build dimensions, yet will maintain the same core net area, when compared to conventional amorphous metal transformer cores. The smaller core build will result in a smaller amorphous metal transformer core, which, in turn, allows for a reduction in size or quantity of other transformer components. For example, a high stack factor amorphous metal transformer will contain smaller coil windings, will be housed in a smaller tank, and, if used in liquid filled transformers, will be filled with less oil. These factors all contribute to a reduced amorphous metal transformer cost.

2. Description of the Prior Art

Amorphous metal transformer cores can be manufactured by winding a single amorphous metal ribbon, or by winding a package consisting of multiple layers of amorphous metal ribbons, into the shape of an annulus. The annulus is then cut along a radial line, creating a single joint. The annulus can be opened at the joint to accommodate placement of the primary and secondary coils, and then closed to recreate the original annulus shape.

Another approach to manufacturing amorphous metal transformer cores is to cut a single amorphous ribbon, or to cut a package consisting of multiple layers of amorphous ribbons, to predetermined lengths. The cut amorphous metal ribbons are then wrapped around a mandrel, or are stacked and wrapped around a mandrel, to create a tightly wound core form. The individual lengths of the amorphous metal ribbon are wrapped about the mandrel such that the cut ends form a distributed series of joints aligned in a localized region of the core. The core can then be opened, by separating the distributed joints, to accommodate placement of the primary and secondary coils, and then closed to recreate the original wrapped core shape.

U.S. Pat. Nos. 4,734,975, 5,261,152 and 5,329,270 disclose amorphous metal transformer cores constructed from groups of amorphous metal ribbon, cut to predetermined length, and wrapped around a mandrel to form a distributed joint core. These patents are incorporated herein by reference for their teachings as to how to produce amorphous metal transformer cores.

Cores manufactured in these manners, with conventional amorphous metal ribbon, are limited to stacking factors of about 86% or less. Accordingly, cores built with these limitations are much larger than conventional silicon steel transformers, use more amorphous metal, more conductor (copper or aluminum) for the primary and secondary coils, more steel for the tank, and, if used in liquid filled transformers, more oil to fill the tank. These factors all contribute to increased materials usage in transformer manufacturing and increased transformer cost. Manufacturing cost penalties range from 20 to 50% (or more).

In addition, the increased size of the transformer is undesirable in many locations and applications where space is limited. The cost and size penalties limit the number of applications, and hence the market size, for amorphous metal transformers.

INVENTION

Amorphous metal ribbon has been produced on a commercial scale with lamination factors, as determined by ASTM A 900-91, between about 0.80 and 0.86. This ribbon has been produced by a single roller, single nozzle slot process, as described in U.S. Pat. No. 4,142,571. U.S. Pat. Nos. 4,865,644 and 5,301,742 teach that space factors (lamination factors) of between about 0.85 and 0.95 can be achieved in amorphous alloy ribbon through the use of a nozzle with multiple slots located in close proximity to each other, but that conventionally processed amorphous alloy ribbons are limited to lamination factors of between about 0.75 and 0.85.

Amorphous metal ribbon of the current invention is cast by a single roller, single slot process, but unexpectedly exhibits lamination factor greater than 0.86. (The term lamination factor is generally used to express the smoothness and uniformity of the ribbon, whereas the term stack factor is applied to cores made from ribbon.) Indeed, lamination factors as high as 92% have been attained. This is achieved by creating highly smooth ribbon surfaces and a highly uniform thickness as measured across the ribbon width.

Highly uniform thickness across the ribbon width is maintained by careful control of the nozzle slot geometry. Ribbon center to ribbon edge thickness uniformity is maintained by ensuring that the nozzle slot remains substantially rectangular. Nozzle material, design and fixturing were chosen in order to control thermomechanical distortion so that the slot width varied by no more than about 5% along its length. Although it is desirable to have a nozzle that is inherently dimensionally stable, clamping the nozzle in such a way as to minimize distortion was found to provide additional control of slot dimensions.

In order to maintain highly uniform ribbon edge to ribbon edge thickness, it is also necessary to control the separation between the nozzle and the wheel so that it varies no more than about 5% from one end of the slot to the other. The present invention utilized a means of adjusting the nozzle position relative to the wheel based on edge to edge measurements of cast ribbon so as to minimize edge to edge thickness variation.

Maintaining highly smooth ribbon surfaces requires that the nozzle surface and wheel surface be smooth. Smooth nozzle surfaces were achieved by machining the nozzle slot surfaces in contact with molten metal during the casting process to achieve a surface roughness surface roughness, Ra, of less than about 5 micrometers. To ensure that a smooth nozzle surface was maintained during the casting process, a protective atmosphere of inert or reducing gas was utilized so as to minimize reactions between the nozzle and the molten metal which can degrade the original surface finish. In addition, the use of the protective atmosphere minimizes the accumulation of slag particles on the nozzle which increase the roughness of the cast ribbon. A smooth casting wheel surface was maintained by the continuous application of an abrasive material with a very fine abrasive particle size, less than about 60 micrometers in mean particle size.

The high lamination factor ribbon permits the construction of high stack factor transformer cores of the present invention. Transformer cores having the high lamination factor amorphous metal ribbon can be made using conventional core building techniques known to those skilled in the art. Cores made with the high lamination factor ribbon can then be clamped, to further reduce overall dimensions, and annealed, to relieve residual mechanical stresses and to generate a desired magnetic anisotropy, without detriment to the final magnetic properties. Transformer cores of the current invention with stack factors of 86% or greater can be designed and produced.

EXAMPLES

Example 1

An $Fe_{80}B_{11}Si_9$ amorphous metal ribbon was cast in the manner taught by U.S. Pat. No. 4,142,571 and using the following specific parameters.

a) Nozzle and Nozzle Fixture

A nozzle body was fabricated from clay-zircon. The nozzle body was integrally reinforced to minimize thermo-mechanical distortion during amorphous metal casting. A 170 mm wide, 0.5 mm (+/−0.08 mm) thick slot was machined into the nozzle body. The machining was performed such that the slot surfaces exhibited a surface roughness $R_a$<5 μm. The nozzle body was placed within an external reinforcing frame to minimize thermo-mechanical expansion during amorphous metal casting.

b) Nozzle Setup and Control

The nozzle was positioned such that the spacing of the nozzle and the casting wheel did not vary by more than 5%. While this spacing is difficult to directly measure and control during amorphous metal casting, real time measurements of actual ribbon thickness provided a proxy of nozzle-to-wheel spacing. These measurements were made using x-ray guages or capacitance probes. Nozzle-to-wheel spacing was continuously adjusted to maintain the variance of less than 5%.

c) Casting Wheel Setup and Control

The casting wheel was ground and polished to achieve a surface roughness $R_a$<5 μm. To minimize the reaction between the molten metal and the casting wheel, the region surrounding the nozzle slot was flooded with a reducing gas. To maintain the smooth casting wheel surface, an abrasive material was continuously applied to the wheel surface during the amorphous metal casting. The abrasive material particle size was less than 150 μm. The abrasive material was contained in the fibers of a brush or mounted on the surface of a paper.

Amorphous metal ribbon, 170 mm wide and 0.023 mm thick, was produced with the following lamination factors, as measured by ASTM A900-91.

| Run | Spool 1 | Spool 2 | Spool 3 | Spool 4 |
|---|---|---|---|---|
| B17237 | 0.876 | 0.915 | 0.909 | 0.905 |
| B17402 | 0.881 | 0.880 | 0.869 | 0.878 |
| B18376 | 0.876 | 0.902 | 0.894 | 0.897 |

Example 2

Amorphous metal ribbons produced in accordance with Example 1 having lamination factors ranging between 0.873 and 0.876 were used to build amorphous metal transformer cores. The transformer cores were constructed using the techniques as described in U.S. Pat. Nos. 4,734,975, 5,261,152 and 5,329,270. Core stack factors were as set below. As used herein, the term stack factor is defined as the ratio between the core leg net cross sectional area and the gross cross sectional area, calculated as $$\text{Stack Factor}=M/(\tfrac{1}{2}(Li+Lo)\times t\times W\times \rho)$$

Where

M=the mass of the core

Li=inside lamination length

Lo=outside lamination length t=measured leg thickness

W=ribbon width

ρ=ribbon density

| Core Number | Stack Factor |
|---|---|
| HF003008 | 0.903 |
| HF003009 | 0.903 |
| HF003013 | 0.900 |
| HF003014 | 0.905 |
| HF003015 | 0.904 |
| HF003016 | 0.904 |

We claim:

1. A process for the production of an amorphous metal ribbon which exhibits a lamination factor of 86% or greater in accordance with ASTM A900-91, which process includes the steps of:

casting molten metal through a nozzle having a single slot onto the surface of a rotating casting wheel and chilling said molten metal at a rate of at least $10^5$ ° K/s to form to form an amorphous metal ribbon;

concurrently polishing the surface of the rotating casting wheel by contacting the surface of said casting wheel with an abrasive material having a mean abrasive particle size of less than 60 micrometers.

2. The process according to claim 1 wherein the amorphous metal ribbon produced by the process exhibits a lamination factor of 90% or greater in accordance with ASTM A900-91.

3. An amorphous metal ribbon produced according to the process of claim 1.

4. An amorphous metal ribbon produced according to the process of claim 2.

5. A transformer core comprising amorphous metal ribbon having lamination factor of 86% or greater wherein the amorphous metal ribbon is produced according to the process of claim 1.

6. A transformer core comprising amorphous metal ribbon having lamination factor of 90% or greater wherein the amorphous metal ribbon is produced according to the process of claims 2.

7. An amorphous metal transformer core exhibiting a stack factor of 86% or greater wherein said transformer core compises an amorphous metal ribbon produced according to the process of claim 1.

8. An amorphous metal transformer core exhibiting a stack factor of 90% or greater wherein said transformer core comprises an amorphous metal ribbon produced according to the process of claim 2.

* * * * *